United States Patent
Ruan et al.

(10) Patent No.: US 10,335,706 B2
(45) Date of Patent: Jul. 2, 2019

(54) COMBINED LIFTING BARN FENCING EQUIPMENT

(71) Applicant: ZHEJIANG DAFENG INDUSTRY CO., LTD., Yuyao, Zhejiang Province (CN)

(72) Inventors: Yutang Ruan, Yuyao (CN); Jianjun Liu, Yuyao (CN); Yifei Xia, Yuyao (CN); Shuyong Zhang, Yuyao (CN); Heqi Zhang, Yuyao (CN); Lifeng Zhou, Yuyao (CN); Qiang Li, Yuyao (CN); Xiushuang Yang, Yuyao (CN); Guangwei Liu, Yuyao (CN); Wenjing Yin, Yuyao (CN); Huili Fang, Yuyao (CN); Yuanle Huang, Yuyao (CN)

(73) Assignee: Zhejiang Dafeng Industry Co., Ltd., Zhejiang Province (CN)

( * ) Notice: Subject to any disclaimer, the term of this patent is extended or adjusted under 35 U.S.C. 154(b) by 431 days.

(21) Appl. No.: 15/190,071

(22) Filed: Jun. 22, 2016

(65) Prior Publication Data
US 2017/0016246 A1 Jan. 19, 2017

(30) Foreign Application Priority Data
Jul. 13, 2015 (CN) .......................... 2015 1 0409342

(51) Int. Cl.
*A63J 1/02* (2006.01)
*A63J 3/00* (2006.01)
(Continued)

(52) U.S. Cl.
CPC ..................... *A63J 1/02* (2013.01);
*A01K 3/00* (2013.01); *A63J 3/00* (2013.01);
*E04H 17/26* (2013.01)

(58) Field of Classification Search
CPC ..... A61K 3/00; A63J 1/02; A63J 1/028; A63J 3/00; E04H 15/04; E04H 15/18;
(Continued)

(56) References Cited

U.S. PATENT DOCUMENTS 113,277 A * 4/1871 Dunne .................... A63J 1/028
472/78
256,860 A * 4/1882 Rood ...................... E04H 15/18
52/63
(Continued)

FOREIGN PATENT DOCUMENTS

CN 2277438 4/1998
CN M321326 11/2007
(Continued)

*Primary Examiner* — Josh Skroupa
(74) *Attorney, Agent, or Firm* — McDonnell Boehnen Hulbert & Berghoff LLP

(57) ABSTRACT

A combined lifting burn fencing equipment is disclosed herein. The combined lifting barn fencing equipment includes a barn movably mounted in a first annular groove in the periphery of stage, a lifting mechanism that drives the barn to lift up and down, a fence movably mounted in a second annular groove of the barn, and a hoisting mechanism that drives the fence to lift up and down. The lifting mechanism is mounted at the bottom of the first annular groove. The hoisting mechanism is mounted at the top of the gate above the stage. The barn is mounted a bedplate. The barn descends to the first annular groove or rises to the above of the stage driven by the lifting mechanism.

9 Claims, 9 Drawing Sheets

(51) Int. Cl.
*A01K 3/00* (2006.01)
*E04H 17/26* (2006.01)

(58) Field of Classification Search
CPC ......... E04H 15/34; E04H 17/00; E04H 17/04; E04H 17/18; E04H 17/26
USPC ........................................ 256/23, 73; 52/63
See application file for complete search history.

(56) References Cited

U.S. PATENT DOCUMENTS

| | | | | |
|---|---|---|---|---|
| 1,608,935 | A * | 11/1926 | Hall ........................ | A63J 3/00 472/87 |
| 1,900,677 | A * | 3/1933 | Weidhaas ................ | A63J 1/028 160/10 |
| 5,502,928 | A * | 4/1996 | Terry ....................... | E04B 1/32 52/80.1 |
| 6,360,496 | B1 * | 3/2002 | Raccuglia ................ | E04H 1/00 52/169.1 |
| 6,450,188 | B1 * | 9/2002 | Langhart ............... | A23L 3/3409 135/115 |
| 8,789,682 | B2 * | 7/2014 | Fisher ..................... | A63J 1/02 198/465.4 |
| 8,807,535 | B2 * | 8/2014 | Stelzer ................... | E01F 7/045 256/12.5 |
| 8,863,443 | B2 * | 10/2014 | Dalo .................. | E04B 1/34315 135/123 |
| 2016/0059147 | A1 * | 3/2016 | Bazydlo ................... | A63J 1/02 242/530 |
| 2016/0114990 | A1 * | 4/2016 | Kynard .................... | B60P 1/43 256/23 |
| 2018/0077919 | A1 * | 3/2018 | McNew .................. | A01K 3/00 |

FOREIGN PATENT DOCUMENTS

| | | | |
|---|---|---|---|
| CN | 201930547 | 8/2011 | |
| CN | 203436809 | 2/2014 | |
| CN | 204386249 | 6/2015 | |
| DE | 3524795 A1 * | 1/1987 | ............. A63J 1/028 |
| EP | 2284332 A2 * | 2/2011 | ............. E04H 15/18 |
| GB | 637114 A * | 5/1950 | ............. E04H 15/18 |
| GB | 2195427 | 4/1988 | |

* cited by examiner

COMBINED LIFTING BARN FENCING EQUIPMENT

FIELD OF THE PATENT APPLICATION

The present patent application relates to a field of stage equipment, in particular, to a combined lifting barn fencing equipment.

BACKGROUND

The barn and the fence are two separate devices in traditional circus. The barn is an annular ring with a width of 1.5 meters, 0.5 meter higher than the stage surface and it is usually a fixed device produced by concrete or steel structure. This kind of fixed barn can completely restrict the stage area, so the circus arena is not suitable for other forms of artistic performances. The barn also blocks the sight of part of audiences, especially the children audiences. Therefore, the entertainment field with fixed barn usually can not be applicable to other artistic forms of performances other than the circus show. Thus, the application of the circus arena is very simple and its utilization efficiency is low, difficulty to increase the benefits.

The fence is made of metal profiles for the cylindrical structure, and steel mesh or fiber woven mesh is installed fixedly outside of the cylindrical structure. The fence includes two types: integrated type and partitioned type. The integrated type fence has a large volume, and it is difficult for handling and storage, therefore, usually it is hung to the above of the stage using a winch, and when it is used, descend it to enclose the stage area. Since this fence is placed above the stage, the installation or use of other stage equipments above the stage area is restricted; of which, the lighting equipments are affected most. The partitioned type of fence needs to be assembled in the site, which is time-consuming and laborious, and if it is used in the midway of show, the performance continuity will be influenced.

SUMMARY

The technical problem to be solved in this patent application is to provide a combined lifting barn fencing equipment that occupies less space and is easy and flexible to use.

To resolve the above technical problem, the patent application provides a combined lifting barn fencing equipment. The combined lifting barn fencing equipment includes a barn movably mounted in a first annular groove in the periphery of stage, a lifting mechanism that drives the barn to lift up and down, a fence movably mounted in a second annular groove of the barn, and a hoisting mechanism that drives the fence to lift up and down. The lifting mechanism is mounted at the bottom of the first annular groove. The hoisting mechanism is mounted at the top of the gate above the stage. The barn is mounted a bedplate. The barn descends to the first annular groove or rises to the above of the stage driven by the lifting mechanism. When the barn descends to the first annular groove, the upper surface of the bedplate is flush with the stage surface. When not connected with the hoisting mechanism for lifting, the fence is naturally shrank to retain inside the second annular groove, when the connected with the hoisting mechanism for lifting, the fence is hoisted to the above of the stage.

Optionally, the lifting mechanism comprises a drive unit fixedly mounted at the bottom of the first annular groove and a transmission device connected with the drive unit through a transmission shaft. The transmission device comprises a minor sprocket coaxially connected with the transmission shaft, a big sprocket connected with the minor sprocket through a chain, a gear coaxially connected with the big sprocket, and a rack engaged with the gear. The rack is fixedly mounted on the barn.

Optionally, the barn comprises a barn body and a barn door that composes a ring with the barn body. The barn door is arranged at the place directly facing the backstage, the lifting of the barn body and the barn door is driven by two groups of lifting mechanisms, respectively.

Optionally, the fence comprises a cylindrical mesh made of braided stainless steel wire meshes and an upper ring and a lower ring arranged at the upper end and lower end of the cylindrical mesh. The lower ring is connected with the bottom of the second annular groove fixedly, and the upper ring is fixedly connected with the bedplate.

Optionally, a movable fencing door is provided in a location of the cylindrical mesh directly facing to the backstage.

Optionally, the hoisting mechanism comprises a winch fixedly mounted on the top of the gate and a sling device connected with the winch; the sling device comprises a sling connected with the winch, a slipknot fixedly installed at the end of the sling and a lifting ring connected with the fence, the slipknot is buckled on the lifting ring.

Optionally, the bedplate is provided with a connecting pin, the middle of the lifting ring is provided with a waist-shaped hole, and the waist-shaped hole is set at the connecting pin, sliding up and down along the connecting pin.

Optionally, a counterweight is provided at the end of the sling.

Optionally, a plurality of corner pulleys for guiding the sling is provided at the top of the gate.

This patent application has the following characteristics compared with the prior art:
(1) This patent application combines two sets of equipments, with less space and easy and convenient to use; when not used, it can be descended to the ground, expanding the scope of the stage, to achieve multi-purposes, that is, it can be used for circus and other forms of performances (musical, concert, variety show, etc.), thus, it can effectively enhance the utilization of venues and improve the economic efficiency of the venues;
(2) This patent application can achieve semi-automation, reduce the labor intensity of the staffs in the venue, shorten the preparation times, and enhance the work efficiency and safety;
(3) This patent application is structurally solid. The barn is hoisted by double racks in the direction of the width, which is stable and reliable, and the fence is lifted using multiple sets of slings, making enclosure safer;
(4) There are no large suspensions, lighting, props, scenery and other hanging equipments above the stage, which can be arbitrarily hung and used in appropriate positions, exerting the best artistic effect;
(5) The fence body in the patent application is woven with high quality stainless steel wire rope, featured by light weight, high strength, and good flexibility. It can reduce injuries caused by animals' collision; in addition, it has high permeability. Compared with conventional steel welded mesh or fiber rope woven mesh, its weight is reduce, strength is increased and perspective rate is enhanced greatly.

In the figures, 1: barn, 2: fence, 3: hoisting mechanism, 4: lifting mechanism, 5: counterweight, 6: bedplate, 11: second annular groove, 12: barn body, 13: barn door, 14: barn body steel frame, 15: barn door steel frame, 21: cylindrical mesh, 22: upper ring, 23: lower ring, 24: fencing door, 31: winch, 32: sling, 33: slipknot, 34: lifting ring, 41: transmission shaft, 42: minor sprocket, 43: chain, 44: big sprocket, 45: gear, 46: rack, 47: drive unit, 61: connecting pin, 62: fixed bedplate, 63: movable bedplate, 341: waist: shaped hole

DETAILED DESCRIPTION

The patent application is described in details in combination with drawings and several preferred embodiments, but the patent application is not_limited to these embodiments. Any alternatives, modifications, equivalents methods and schemes made within the essence and scope of the patent application shall fall within the scope of protection herein. In order to enable the public to have a thorough understanding of the patent application, specific details are described in the preferred embodiments herein, but those skilled in the art can fully understand the patent application without the description about these details.

Figure 1:
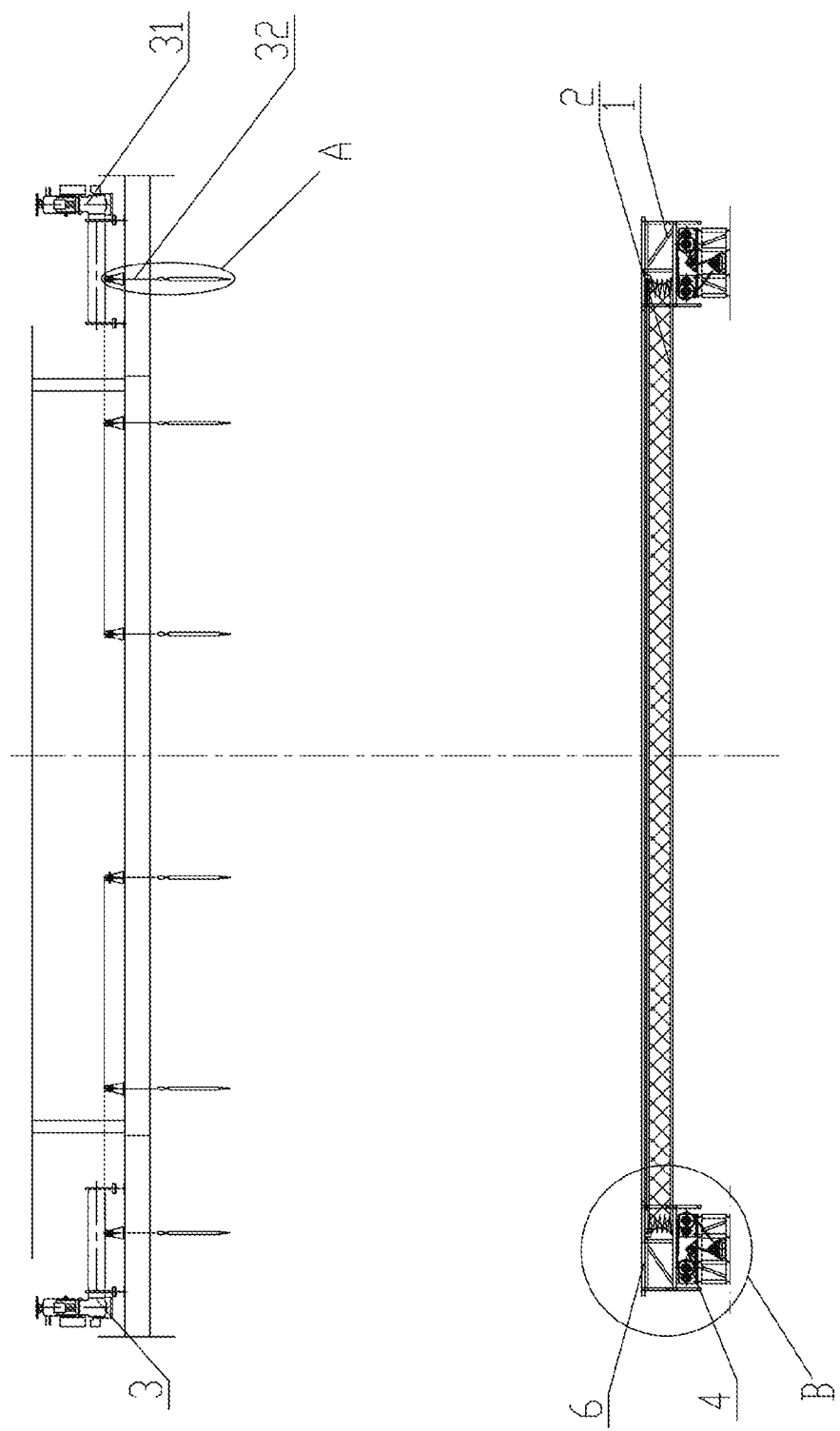
FIG. 1 shows a front structural diagram of a combined lifting barn fencing equipment in the patent application.
Figure 9:
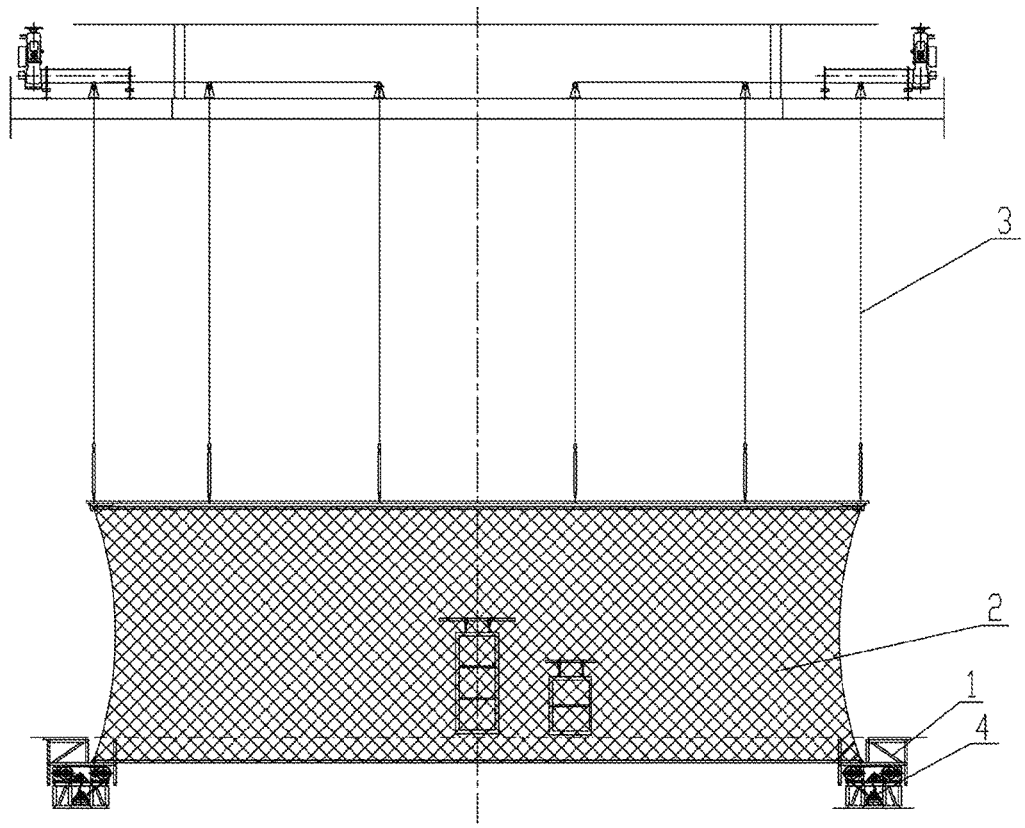
FIG. 9 shows a front structure diagram of a combined lifting barn fencing equipment when the fence is lifted in the patent application.
Figure 10:
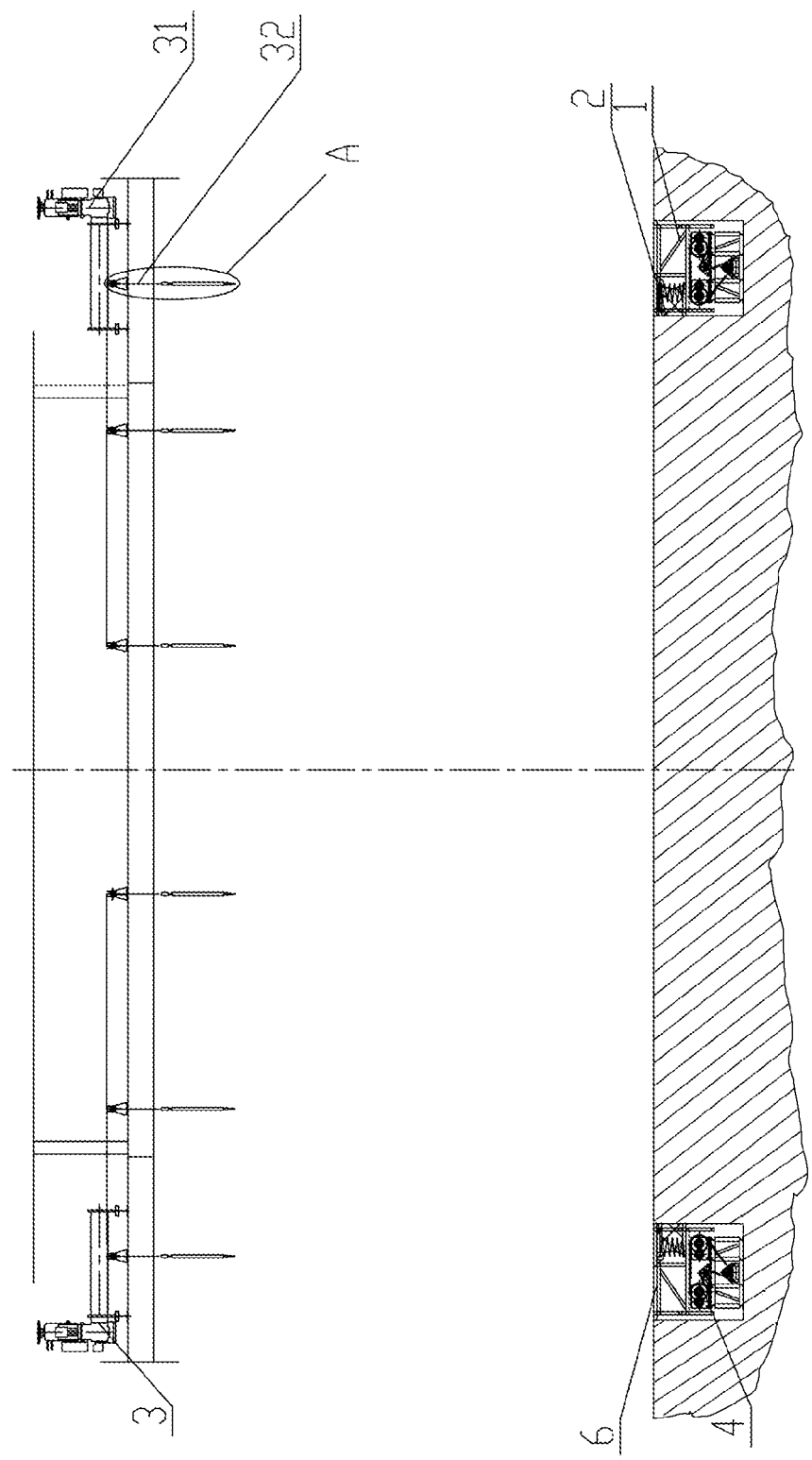
FIG. 10 shows a front structure diagram of a combined lifting barn fencing equipment mounted to the stage.

The front structures of a combined lifting barn fencing equipment in the patent application are shown in FIG. 1, FIG. 9 and FIG. 10. The combined lifting barn fencing equipment, including a barn 1 movably mounted in a first annular groove in the periphery of stage, a lifting mechanism 4 that drives the barn 1 to lift up and down, a fence 2 movably mounted in a second annular groove 11 of the barn 1, and a hoisting mechanism 3 that drives the fence 2 to lift up and down, the lifting mechanism is mounted at the bottom of the first annular groove, the hoisting mechanism 3 is mounted at the top of the gate above the stage, the barn 1 is mounted a bedplate 6; the barn 1 descends to the first annular groove or rises to the above of the stage driven by the lifting mechanism 4, when the barn 1 descends to the first annular groove, the upper surface of the bedplate 6 is flush with the stage surface; when not connected with the hoisting mechanism 3 for lifting, the fence 2 is naturally shrank to retain inside the second annular groove 11, when the connected with the hoisting mechanism 3 for lifting, the fence 2 is hoisted to the above of the stage.

Referring to FIG. 3-FIG. 6, the lifting mechanism 4 includes a drive unit 47 fixedly mounted at the bottom of the first annular groove and a transmission device connected with the drive unit 47 through a transmission shaft 41; the transmission device includes a minor sprocket 42 coaxially connected with the transmission shaft 41, a big sprocket 44 connected with the minor sprocket 42 through a chain 43, a gear 45 coaxially connected with the big sprocket 44, and a rack 46 engaged with the gear 45, the rack 46 is fixedly mounted on the barn 1.

The above transmission device includes a multiple groups. The multiple groups of transmission device is uniformly arranged at the bottom of the first annular groove, and connected with the drive unit through the transmission shaft, wherein the drive unit is a geared motor.

The barn 1 includes a barn body 12 and a barn door 13 that composes a ring with the barn body 12, the barn door 13 is arranged at the place directly facing the backstage, the lifting of the barn body 12 and the barn door 13 is driven by two groups of lifting mechanisms 4, respectively, to facilitate the animal trainer and animals to enter the barn; the rack of the lifting mechanism that drives the barn body is fixedly mounted at the barn body steel frame 14, and the rack of the lifting mechanism that drives the barn door is fixedly mounted at the barn door steel frame 15.

Figure 3:
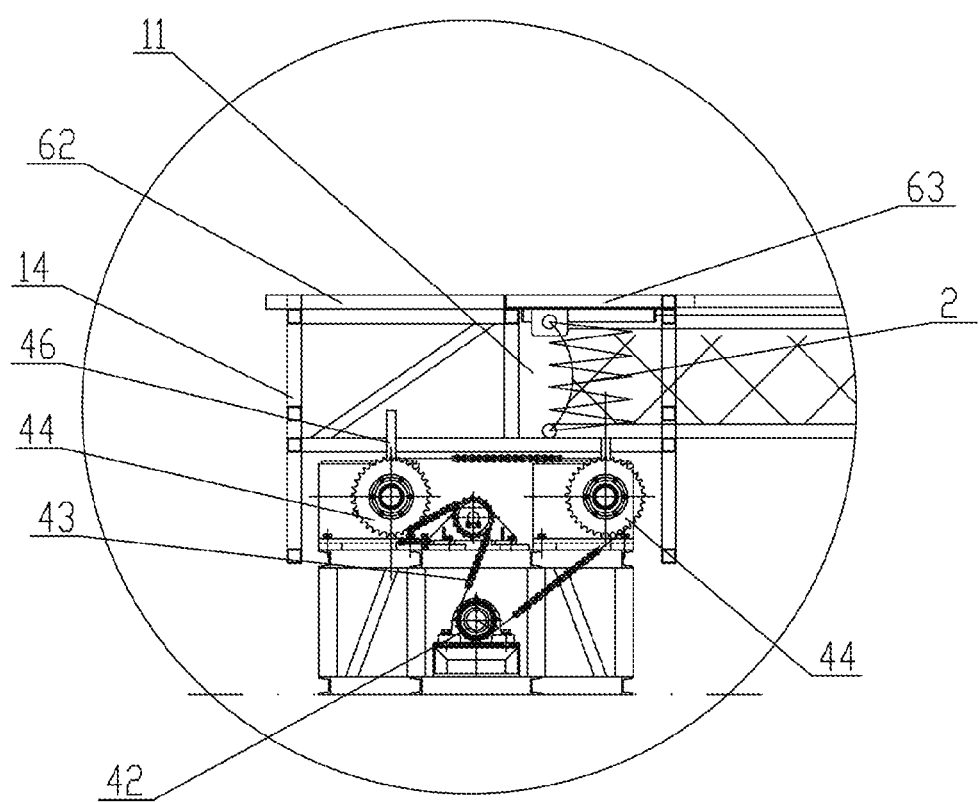
FIG. 3 shows an enlarged view of part B of FIG. 1.
Figure 4:
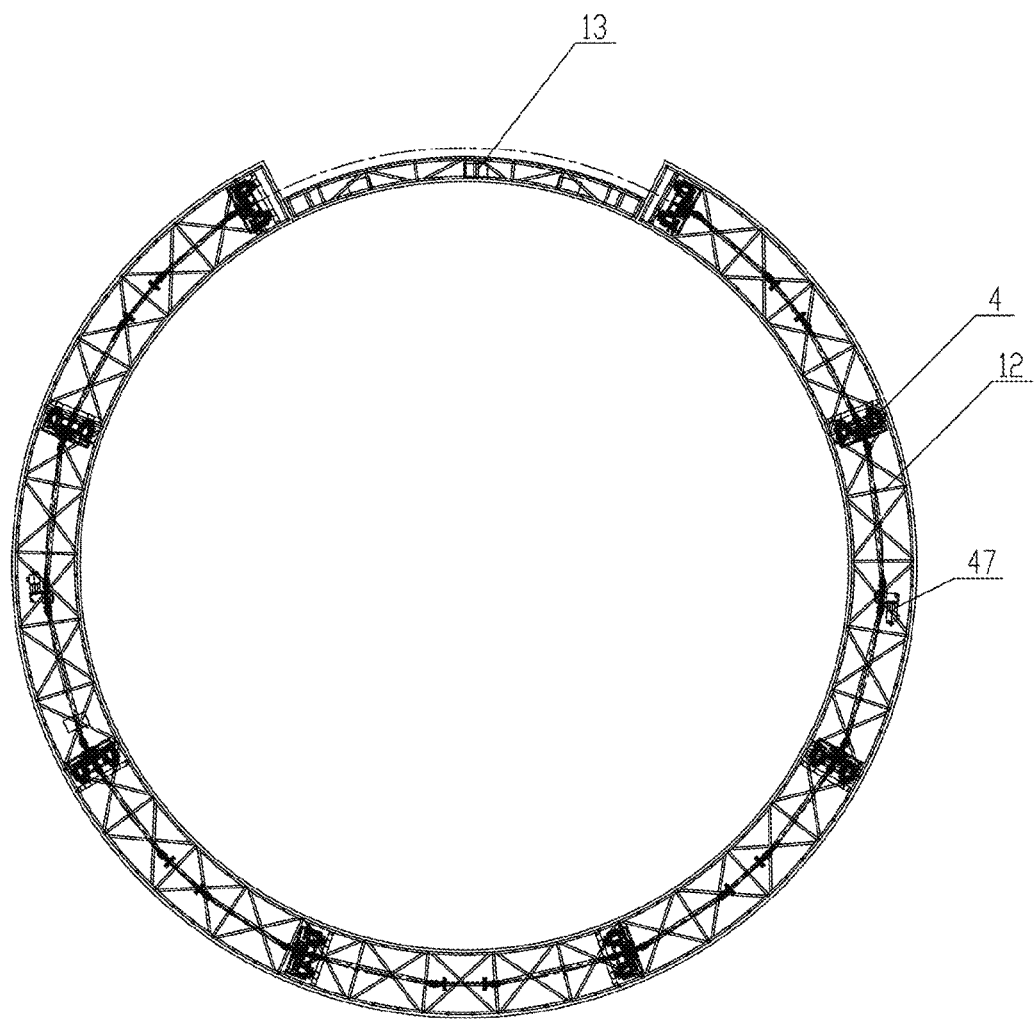
FIG. 4 shows a top view of a combined lifting barn fencing equipment in the patent application.
Figure 5:
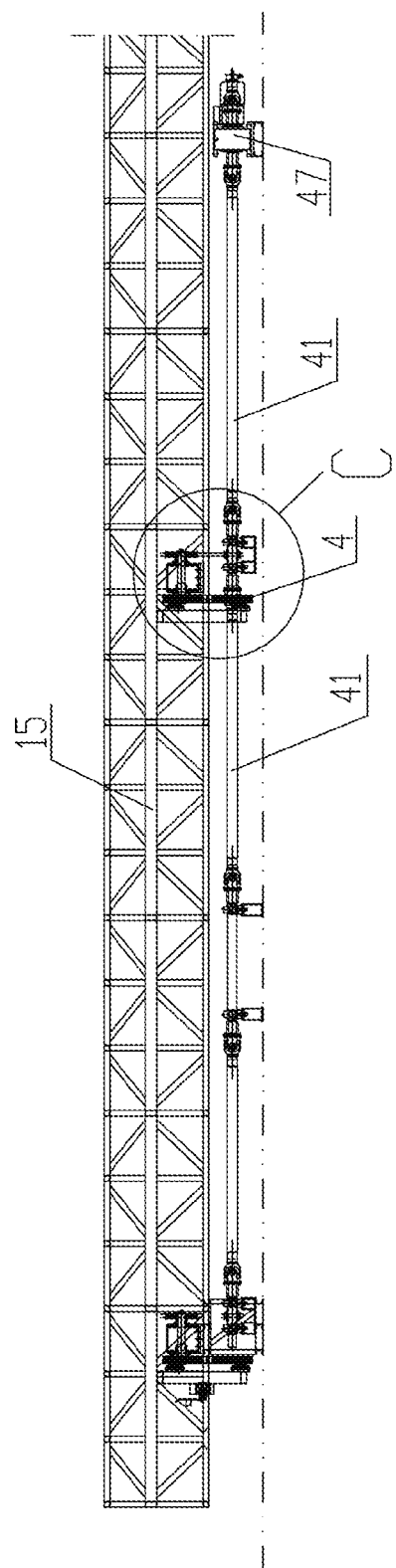
FIG. 5 shows a front structure diagram of a combined lifting barn fencing equipment in the patent application.
Figure 6:
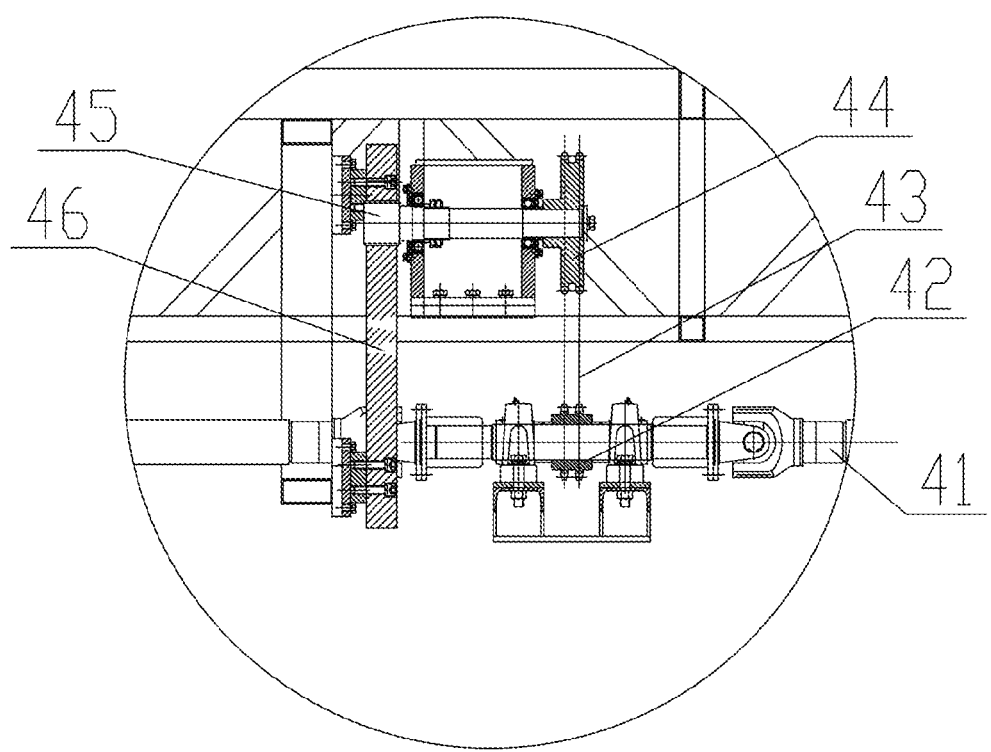
FIG. 6 shows an enlarged view of part C in FIG. 5.
Figure 7:
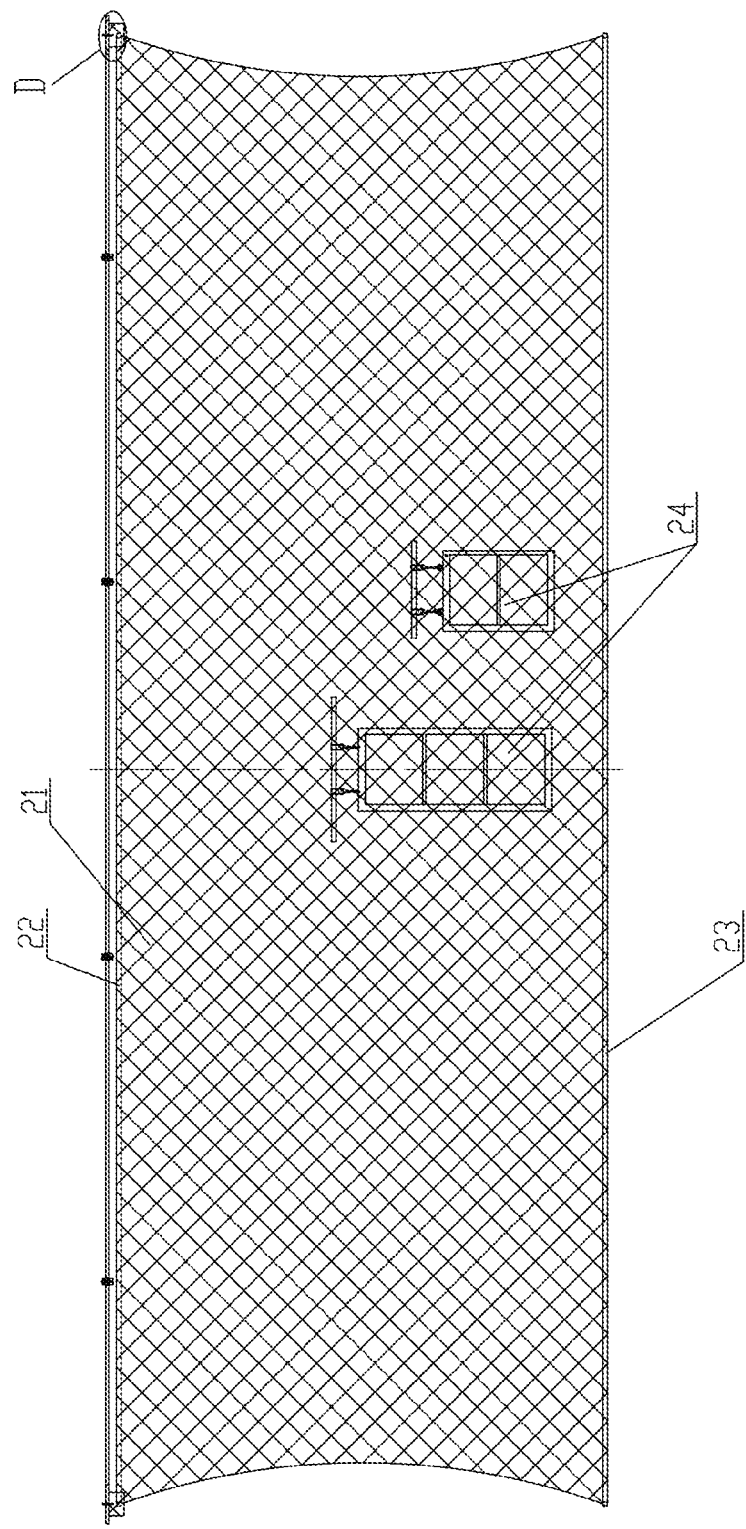
FIG. 7 shows a structure diagram of a combined lifting barn fencing equipment fence after lifting and expanding in the patent application.

Since the barn body steel frame width 14 is wider than the barn door steel frame 15, the transmission mechanism that drives the lifting device of the barn body adopts two groups of gear racks for engaged transmission. The two groups of racks are arranged at both sides of the barn body steel frame, as shown in FIG. 3, that is, the minor sprocket drives two big sprockets through the chains, and each big sprocket drives a group of gear racks respectively. Referring to FIG. 7, the fence 2 includes a cylindrical mesh 21 made of braided stainless steel wire meshes and an upper ring and a lower ring 22, 23 arranged at the upper end and lower end of the cylindrical mesh 21, the lower ring 23 is connected with the bottom of the second annular groove 11 fixedly, and the upper ring 22 is fixedly connected with the bedplate 6.

The fence in the patent application is woven with high quality stainless steel wire rope, featured by light weight, high strength, and good flexibility. It can reduce injuries caused by animals' collision; in addition, it has high permeability. Compared with conventional steel welded mesh or fiber rope woven mesh, its weight is reduce, strength is increased and perspective rate is enhanced greatly.

A movable fencing door 24 is provided in a location of the cylindrical mesh 21 directly facing to the backstage, to facilitate the animal trainers and animals to enter the fence.

The hoisting mechanism 3 includes a winch 31 fixedly mounted on the top of the gate and a sling device connected with the winch 31; the sling device includes a sling 32 connected with the winch 31, a slipknot 33 fixedly installed at the end of the sling 32 and a lifting ring 34 connected with the fence 2, the slipknot 33 is buckled on the lifting ring 34.

The above sling devices include multiple groups, which are uniformly arranged in the fence, to ensure the fence is stable when lifting. In this embodiment, 2 winches are adopted, and each winch can drive 6 groups of sling devices respectively.

Figure 8:
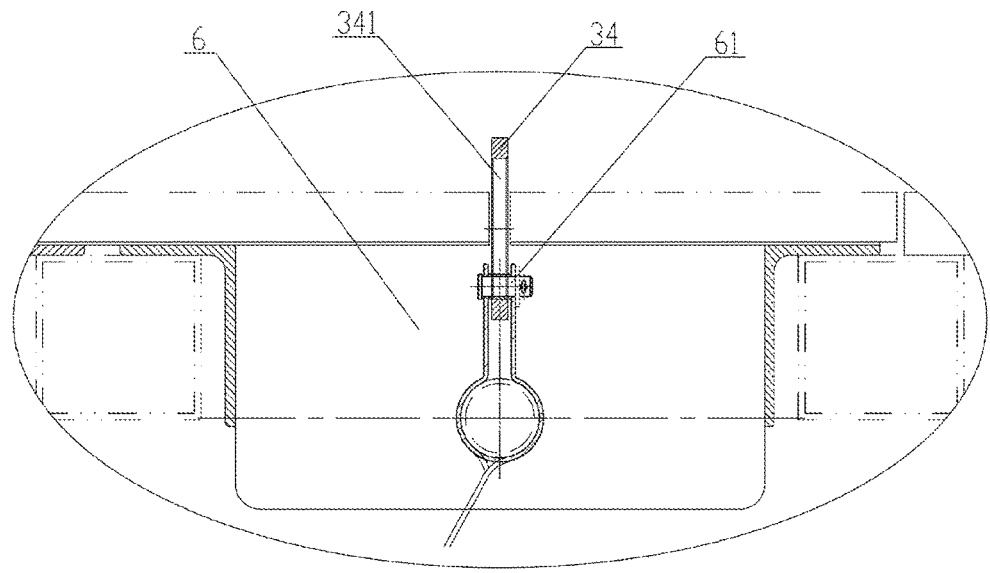
FIG. 8 shows an enlarged view of part D of FIG. 7.

Referring to FIG. 8, the bedplate 6 is provided with a connecting pin 61, the middle of the lifting ring 34 is provided with a waist-shaped hole 341, and the waist-shaped hole 341 is set at the connecting pin 61, sliding up and down along the connecting pin 61. When the lifting ring is not used, release the slipknot, the lifting ring will slide down under their own gravity. Its upper surface is flush with the stage surface.

The bedplate 6 includes a fixed bedplate 62 and a movable bedplate 63 arranged above the second annular groove. The connecting pin 61 is fixedly mounted below the movable bedplate 63, and the upper ring 22 of the fence 2 is fixedly mounted below the movable bedplate 63.

Figure 2:
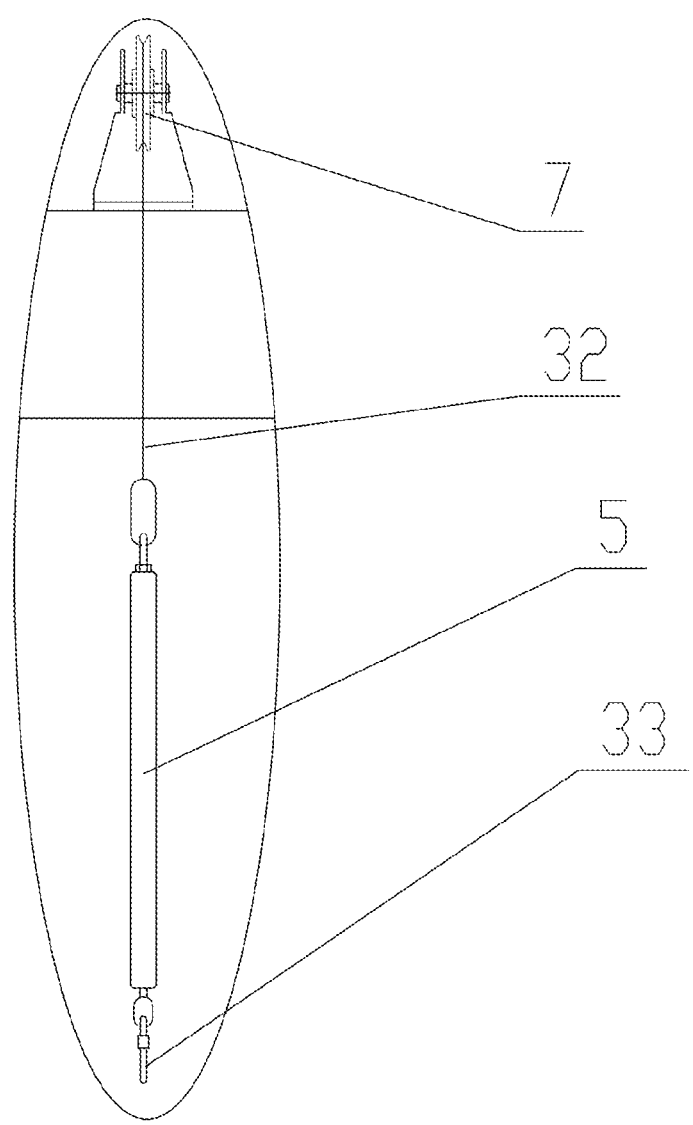
FIG. 2 shows an enlarged view of part A of FIG. 1.

Referring to FIG. 2, a counterweight 5 is provided at the end of the sling 32, to ensure that the sling can stably rise and descend under a no-load state.

A plurality of corner pulleys 7 for guiding the sling 32 is provided at the top of the gate, which can guide the slings to the specified locations to make uniform distribution of slings and ensure stable descending and rising of the fence.

When the barn needs to be used, the barn body drive unit is driven to lift the barn body to the above of the stage, and after the animal trainer and animals enter the barn, the barn door drive unit is driven to lift the barn door at the same height; when the barn is not used, only the barn body drive unit and the barn door drive unit are driven to lower the barn into the first annular groove, making the upper surface of the bedplate is flush with the stage surface; when the fence needs to be used, the winch is driven to descend the sling to the buckle the snap to the lifting ring, then the winch is driven to make the sling to lift the movable bedplate to move upwards with the fence upper ring until the mesh body between the upper ring and the lower ring is tightened to form an annular fence; when the fence is not used, the winch is driven to move the sling downwards, and the cylindrical mesh is naturally shrank to the storage tank of the barn, until the movable bedplate is completely reset, then the slipknot is released, the lifting ring slides naturally, to make the upper surface flush with the stage surface; when neither the barn nor the fence is used, the barn is descended to the same level as the stage surface, at this time, the fixed and movable bedplates on the barn can be used as an ordinary stage surface, and the stage is expanded for the performance of musical drama, concerts, variety show, and etc.

The above embodiments do not describe all details nor limit the patent application. Apparently, many modifications and variations can be made according to the above descriptions. These embodiments in the patent application are to explain the principle and actual application of the patent application, so that the person skilled in the art can make good use of the patent application or modify to use them. The patent application is limited only by the claims and their full scope and equivalents.

The invention claimed is:

1. A combined lifting barn fencing equipment, comprising:
    a barn (1) movably mounted in a first annular groove in the periphery of a stage,
    a lifting mechanism (4) that drives the barn (1) to lift up and down,
    a fence (2) movably mounted in a second annular groove (11) of the barn (1), and
    a hoisting mechanism that drives the fence (2) to lift up and down,
    wherein the lifting mechanism is mounted at the bottom of the first annular groove, the hoisting mechanism (3) is mounted at the top of a gate above the stage, the barn (1) is mounted to a bedplate (6); the barn (1) descends to the first annular groove or rises to above of the stage driven by the lifting mechanism (4), when the barn (1) descends to the first annular groove, the upper surface of the bedplate (6) is flush with a stage surface; when not connected with the hoisting mechanism (3) for lifting, the fence (2) is retained inside the second annular groove (11), when connected with the hoisting mechanism (3) for lifting, the fence (2) is hoisted to the above of the stage.

2. The combined lifting barn fencing equipment according to claim 1, wherein the lifting mechanism (4) comprises a drive unit (47) fixedly mounted at the bottom of the first annular groove and a transmission device connected with the drive unit (47) through a transmission shaft (41); the transmission device comprises a minor sprocket (42) coaxially connected with the transmission shaft (41), a big sprocket (44) connected with the minor sprocket (42) through a chain (43), a gear (45) coaxially connected with the big sprocket (44), and a rack (46) engaged with the gear (45); the rack (46) is fixedly mounted on the barn (1).

3. The combined lifting barn fencing equipment according to claim 1, wherein the barn (1) comprises a barn body (12) and a barn door (13) that composes a ring with the barn body (12), the barn door (13) is arranged at the place directly facing the backstage, the lifting of the barn body (12) and the barn door (13) is driven by two groups of lifting mechanisms (4), respectively.

4. The combined lifting barn fencing equipment according to claim 1, wherein the fence (2) comprises a cylindrical mesh (21) made of braided stainless steel wire meshes and an upper ring and a lower ring (22, 23) arranged at the upper end and lower end of the cylindrical mesh (21), the lower ring (23) is connected with the bottom of the second annular groove (11) fixedly, and the upper ring (22) is fixedly connected with the bedplate (6).

5. The combined lifting barn fencing equipment according to claim 4, wherein a movable fencing door (24) is provided in a location of the cylindrical mesh (21) directly facing to the backstage.

6. The combined lifting barn fencing equipment according to claim 1, wherein the hoisting mechanism (3) comprises a winch (31) fixedly mounted on the top of the gate and a sling device connected with the winch (31); the sling device comprises a sling (32) connected with the winch (31), a slipknot (33) fixedly installed at the end of the sling (32) and a lifting ring (34) connected with the fence (2), the slipknot (33) is buckled on the lifting ring (34).

7. The combined lifting barn fencing equipment according to claim 6, wherein the bedplate (6) is provided with a connecting pin (61), the middle of the lifting ring (34) is provided with a waist-shaped hole (341), and the waist-shaped hole (341) is set at the connecting pin (61), sliding up and down along the connecting pin (61).

8. The combined lifting barn fencing equipment according to claim 6, wherein a counterweight (5) is provided at the end of the sling (32).

9. The combined lifting barn fencing equipment according to claim 6, wherein a plurality of corner pulleys (7) for guiding the sling (32) is provided at the top of the gate.

* * * * *